United States Patent
Söderlind et al.

(10) Patent No.: US 9,609,882 B2
(45) Date of Patent: Apr. 4, 2017

(54) APPARATUS FOR REMOVING BONES FROM FISH MEAT

(71) Applicant: Nordischer Maschinenbau Rud. Baader GmbH + Co. KG, Lübeck (DE)

(72) Inventors: Jan Söderlind, Norrtälje (SE); Oddmund O. Haugland, Stavanger (NO)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 15/024,281

(22) PCT Filed: Sep. 9, 2014

(86) PCT No.: PCT/SE2014/051031
§ 371 (c)(1),
(2) Date: Mar. 24, 2016

(87) PCT Pub. No.: WO2015/047160
PCT Pub. Date: Apr. 2, 2015

(65) Prior Publication Data
US 2016/0227794 A1    Aug. 11, 2016

(30) Foreign Application Priority Data
Sep. 27, 2013    (SE) ...................... 1351121

(51) Int. Cl.
*A22C 25/16*    (2006.01)
(52) U.S. Cl.
CPC .................. *A22C 25/166* (2013.01)
(58) Field of Classification Search
CPC ....... A22C 25/16; A22C 17/04; A22C 17/004; A22C 21/0076; A22C 21/0083
(Continued)

(56) References Cited

U.S. PATENT DOCUMENTS

| 1,138,300 A | * | 5/1915 | Letin et al. ............ | A22C 25/14 |
| | | | | 452/121 |
| 4,819,811 A | * | 4/1989 | Ewing .................... | A22C 17/04 |
| | | | | 100/90 |

(Continued)

FOREIGN PATENT DOCUMENTS

| NO | 323332 B1 | 3/2007 |
| SE | 467904 B1 | 10/1992 |

(Continued)

OTHER PUBLICATIONS

International Preliminary Report on Patentability dated Mar. 29, 2016 from International Patent Application No. PCT/SE2014/051031 filed Sep. 9, 2014.

(Continued)

*Primary Examiner* — Richard Price, Jr.
(74) *Attorney, Agent, or Firm* — Sunstone IP

(57) ABSTRACT

The invention relates to an apparatus for removal of pin bones from fish meat, preferably from a fillet of white fish, comprising a frame for supporting a drive device and a rotatably driven member driven by drive device, the rotatably driven member being provided with engagement means, and a counter pressure element for providing a clamping function between the counter pressure element and the rotatably driven element. The rotatably driven member has a curved convex engagement surface directed towards the fillet and adapted to match the shape of said fillet where the pin bones are located when the fillet is lying on a flat surface.

16 Claims, 4 Drawing Sheets

Figure 1:
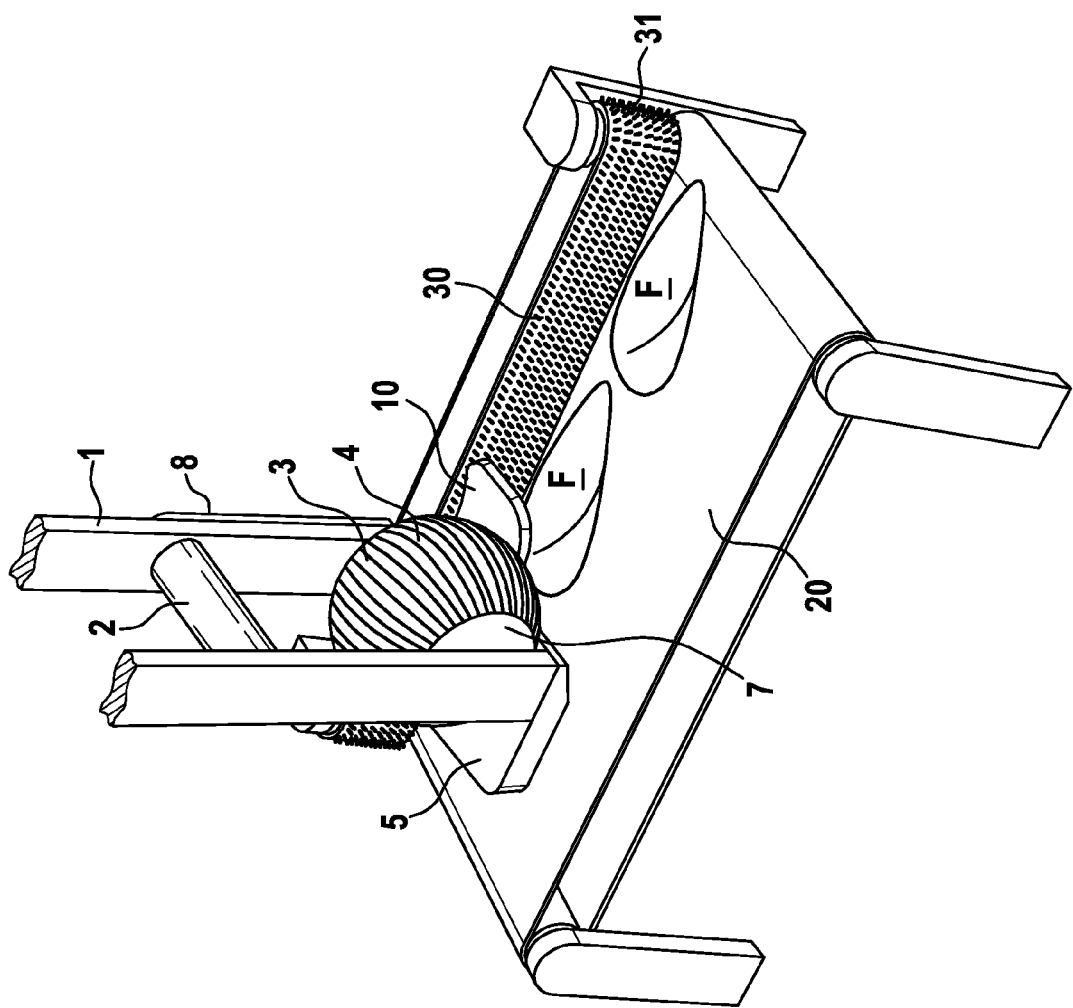

(58) Field of Classification Search
USPC .................................................. 452/135, 138
See application file for complete search history.

(56) References Cited

U.S. PATENT DOCUMENTS

| | | | |
|---|---|---|---|
| 5,877,426 A | 3/1999 | Hay et al. | |
| 2003/0109210 A1* | 6/2003 | Jacobsen .............. | A22C 25/166 452/138 |
| 2006/0172675 A1* | 8/2006 | Norgaard .............. | A22C 25/166 452/135 |
| 2008/0145184 A1 | 6/2008 | Levin et al. | |
| 2011/0319003 A1* | 12/2011 | Breiland .............. | A22C 25/166 452/135 |
| 2015/0216194 A1* | 8/2015 | Jurs ........................ | A22C 25/16 452/135 |

FOREIGN PATENT DOCUMENTS

| | | |
|---|---|---|
| SE | 500531 C2 | 5/1994 |
| WO | 9212641 A1 | 8/1992 |
| WO | 9718717 A1 | 5/1997 |
| WO | 9952375 A1 | 10/1999 |
| WO | 0143553 A1 | 6/2001 |

OTHER PUBLICATIONS

International Search Report and Written Opinion dated Dec. 18, 2014 from International Patent Application No. PCT/SE2014/051031 filed Sep. 9, 2014.

Examination Report dated Mar. 25, 2014 from Swedish Patent Application No. SE1351121-7 filed Sep. 27, 2013.

* cited by examiner

APPARATUS FOR REMOVING BONES FROM FISH MEAT

FIELD OF THE INVENTION

The invention relates to an apparatus for removing bones from fish meat, especially for the removal of so called pin bones or nerve bones, from fillets of fishes of white fish and particular fillets of fishes of the family Gadidae, below called cod fishes.

BACKGROUND OF THE INVENTION

The removal of the pin bones from fillets of salmon is done today, in industrial scale, by hand machines and automatic machines.

However, upon removal of pin bones from fillets of white fish, i.e. cod fishes such as cod, haddock, whiting and saithe, a major problem is the waste arising from the removal of said pin bones and the costs for said removal. This is because the pin bones are removed by a so-called V-cut, which means that the pin bones are cut out. This is done manually with a knife or automatically using rotating blades or by water jet. This means that the fillet becomes completely or partially cut through which generates plenty of waste matter regardless of how the cut is performed, and the fillet is given a less appetizing appearance and the value of the fillet decreases since the pin bones are located at the most valuable part of the fillet.

The difficulty of removing pin bones from fillets of white fish depends upon that the ends of the pin bones are located a bit down towards the abdomen, where the fillet of white fish/cod fishes exhibits a curved surface, and more particularly a concavely shaped surface.

One way to avoid the above problem is to transport the fish to low-wage countries such as China, where the pin bones are removed by hand, and the fillets are then transported to refrigerated display counters of a store. However, this means that the fish or fillet is frozen and thawed several times during the process which impairs its quality. In addition, the long transports have a negative impact on the environment.

By the Swedish patent with publication number SE-467 904 a device is known for removing fish bones, in particular pin bones from fillets of salmon. This known device comprises a housing in which a rotatable driven element is provided. The element is provided with engagement means and has the shape of a cylinder or a truncated cone. The housing has an opening so as to expose a portion of the engagement means of the driven element. Further, there is a resilient abutment which is arranged adjacent and in such a way that a gap is formed between the abutment and the driven element. Upon removal of the fish bones, the fish bones are carried into the gap and clamped between the abutment and the driven element and brought into the housing and discharged through an opening in the housing. A pneumatic disposal unit is connected to the opening.

A disadvantage of this apparatus is that it includes a housing in which fish waste can get stuck and which is difficult to clean. Further, it comprises an expensive and complicated bevel gear.

A further apparatus for particularly removing bones from fish, and more particularly so-called nerve bones or abdominal bones from salmon fillets, is known by the Swedish patent with publication number SE-500 531.

This apparatus differs from the first mentioned apparatus by not include a housing, instead the rotatably driven element is mounted axially on a drive shaft for driving the same. Also this rotatable driven element has the shape of a cylinder.

Both of these apparatuses are intended for the removal of bones, particularly pin bones, from fillets of salmon, but none of them are suitable for removing of pin bones from white fish for reasons stated below.

At a fillet of salmon the ends of the pin bones are located at, when the file is located on a horizontal, flat surface and with the skin side facing said surface, the highest point of the fillet, which means that they are relatively easy to access with the above described apparatuses. Thus, the engagement surface of the rotatably driven element of the prior art has the shape of a cylinder, i.e. the engagement surface of the rotatably driven element forms a straight line which, when removing the pin bones from a fillet of salmon, is parallel with the flat surface of said fillet of salmon.

One difficulty of removing pin bones from fillets of cod fishes is that the ends of pin bones are, when the file is located on a horizontal, flat surface and with the skin side facing said surface, not located at the highest point of the fillet, instead they located a bit down towards the abdomen, where the fillet of cod fishes and many other fish species exhibit a curved surface, and more particularly a concavely shaped surface. This means that the above-mentioned devices for the removal of pin bones from fillets of salmon are not suitable for the removal of pin bones from fillets of cod fishes.

By WO 01/43553 A1 a method and apparatus is known in which the fillets are placed on a conveyor having an upwardly extending edge for elevating a particular area of the fillets and thereby bending the fillets so that the area in which the pin bones are located obtains the highest point above the conveyor and thereby allow the bone removal unit to be brought into contact with said particular area.

Also the engagement surface of the bone removal unit of this application forms a straight line which is parallel with the highest point of the surface of said fillet.

Moreover, since the fillets are bent cracks are possibly formed in the fillets which lower the value of the fillets. It is also difficult to position the fillets on the conveyor so that the ends of pin bones always obtain the highest point above the conveyor.

The above-mentioned Swedish patents have application date 18 Jan. 1991 and 10 Nov. 1992, respectively, and the priority date for the international application is 14 Dec. 1999. Thus, there has been a long felt need for an apparatus for removing pin bones from fillets of white fish.

SUMMARY OF THE INVENTION

The object of the invention is to provide an apparatus by means of which it is possible to remove pin bone from fillets of white fish, especially cod fishes, preferably on a larger scale without any appreciable amount of fish meat being lost or the appearance of the fillets being impaired.

This object is achieved according to the invention with an apparatus for removal of pin bones from fish meat, preferably from fillets of white fish, comprising a frame for supporting a drive device and a rotatably driven member driven by drive device, the rotatably driven member being provided with engagement means, and a counter pressure element for providing a clamping function between the counter pressure element and the rotatably driven element, wherein the rotatably driven member has a curved convex engagement surface directed towards the fillet of fish and adapted to match the shape of said fillet where the pin bones are located when said fillet is lying on a flat surface.

Further embodiments of the apparatus for removal of pin bones from fish meat according to the invention are set forth in the dependent claims.

Figure 2:
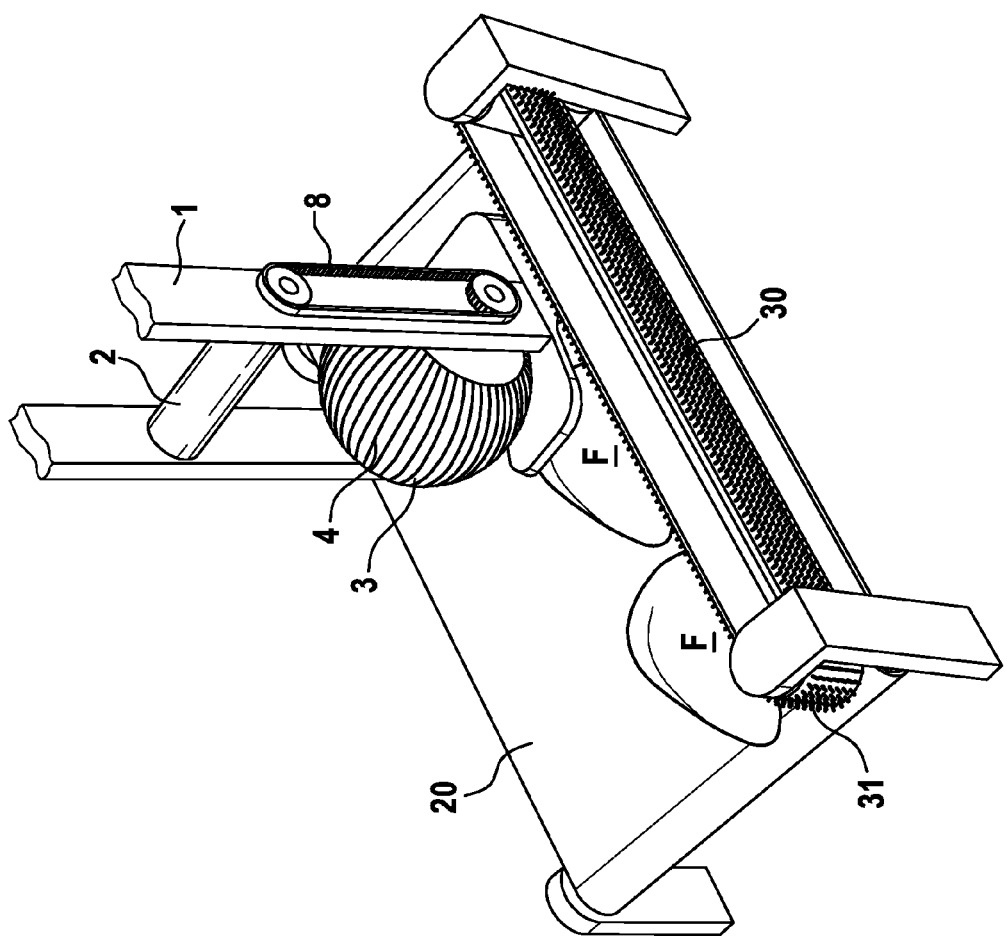
Figure 3:
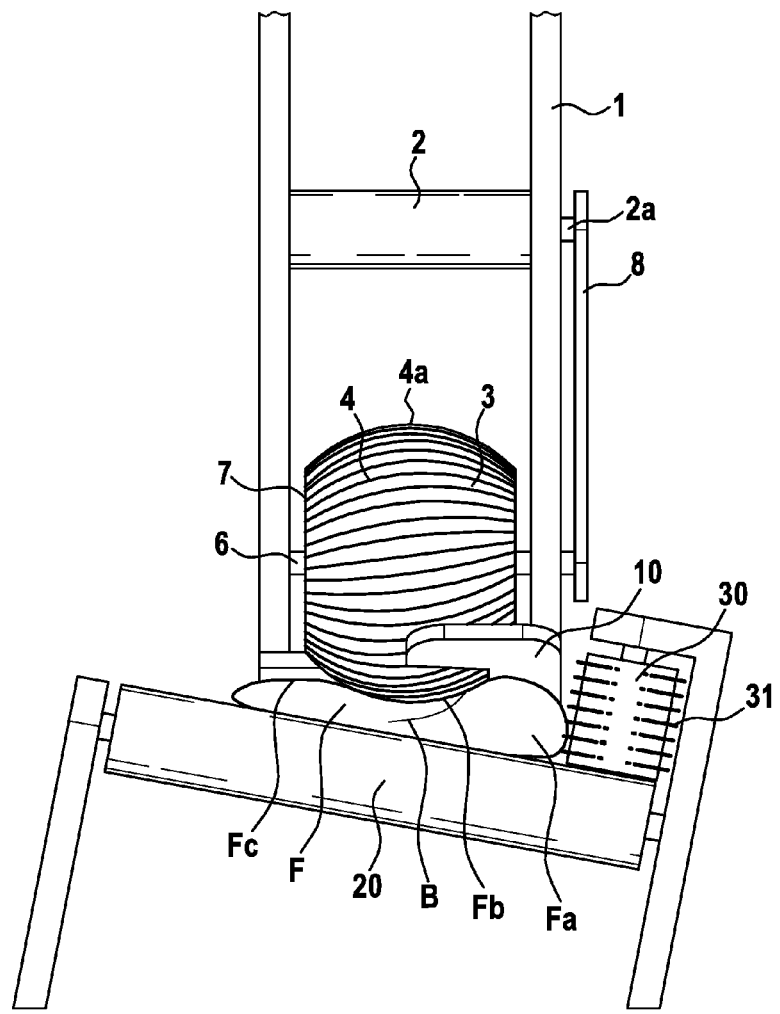
Figure 4:
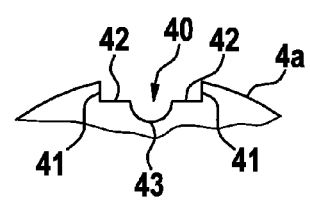
Figure 5:
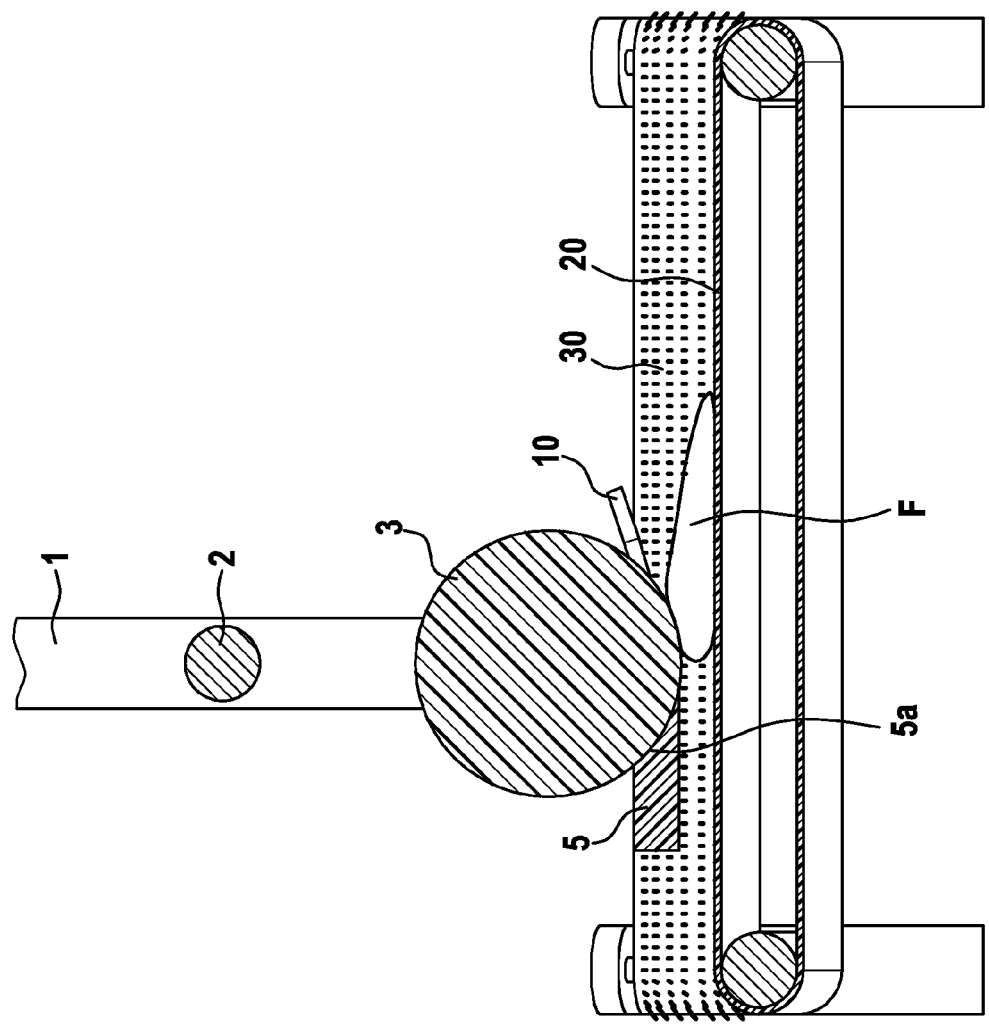

The invention will now be described in more detail in the form of a non-limiting example with reference to the accompanying drawings, in which FIG. 1 is a schematic perspective view of an apparatus according to the invention for removal of pin bones from fillets of white fish, especially cod fishes, FIG. 2 is a schematic perspective view of the apparatus of FIG. 1 from another direction, FIG. 3 is a schematic end view of the apparatus according to the invention from the input side of the fillets, FIG. 4 is an enlarged view of an engagement means for pin bones, and FIG. 5 is a schematic sectional side view of the apparatus in FIG. 1.

DETAILED DESCRIPTION OF PREFERRED EMBODIMENTS

In the following description and on the drawings the apparatus according to the invention is described and displayed for removing pin bones applied to one side of a fish fillet, but since each fish has two sides with a fillet each, a left and a right side, in practical practice of the invention, two mirrored apparatuses are arranged.

As shown in FIG. 1-3, an apparatus according to the invention for removal of pin bones B from the fish meat, preferably from fillets F of white fish, comprises a frame 1 which supports a drive device 2 and a rotatably driven element 3 driven by said drive device. The rotatably driven element is provided with engagement means 4, see in particular FIG. 4, which together with a counter pressure element 5 provide a clamping function, whereby a pin bone is intended to be clamped between the respective engagement means 4 and the counter pressure element 5 for removal from the fillet upon rotation the rotatably driven element. In a preferred embodiment, the rotatably driven member 3 is mounted on a horizontal driven shaft 6, and said shaft is preferably used to rotate said rotatably driven member 3. The driven shaft 6 is adapted to be driven by the drive device 2, which may consist of an electric motor, a pneumatic motor or a motor of any other suitable type. In the illustrated embodiment, a timing belt 8 is adapted to transfer a rotary motion of a driven shaft 2a arranged at the drive device 2 to the driven shaft 6. In an embodiment not shown, the drive device 2 can be coupled directly to the shaft 6.

In one embodiment, the frame 1 with the rotatably driven element 3 is preferably mounted stationary in relation to the transverse direction of a first, elongated conveyor belt 20, but is arranged adjustable in height in relation to the conveyor belt 20. The conveyor belt 20 has preferably a fillet receiving surface with low friction. A second, vertical conveyor belt 30, preferably with a fillet back receiving surface with high friction, such as a belt provided with protruding means 31, for example in the form of spikes, is arranged to cooperate with the first conveyor belt 20 for conveying the fish fillets F against the rotatably driven element 3. The first conveyor belt 20 is preferably angled relative to a horizontal plane, and the second conveyor belt 30 is angled approximately 90° in relative to the first conveyor belt so as to form a standing second conveyor belt 30.

Specifically, the first conveyor belt 20 is so angled that, when a fillet F of fish is placed on said belt with the skin side against the belt and the back side against the second conveyor belt 30, the fillet F of fish will slide towards the second conveyor belt until the back side of the fillet abuts against said second conveyor belt.

Further, the second conveyor belt 30 is adjustably disposed transversely of the first conveyor belt 20 so as to regulate the position of the fillets F relative to a transverse direction of the first conveyor belt 20. This makes it possible to adapt the rotatably driven member 3 to the location of the pin bones of different sized fillets in the case the rotatably driven member 3 is positioned in a fixed relation to the transverse direction of the first conveyor belt 20.

The fillet F of fish positioned on the first conveyor belt 20 has, as seen in the direction from the second conveyor belt 30, a back portion Fa, which has the largest thickness of the fillet, after which the fillet transforms into a portion Fb having a concavely shaped surface, which in its turn transforms into a portion Fc with a relatively flat surface corresponding to the abdomen/stomach of the fish. It is in the surface of the concavely shaped portion Fb where the ends of the pin bones B are located.

The rotatably driven element 3 has a convex engagement surface 4a adapted to match the concavely shaped surface of portion Fb of the fillet F of the fish. More specifically, the convex engagement surface 4a is thus adapted to match the shape of said fillet of white fish/cod fishes where the pin bones are located.

On the engagement surface of the rotatably driven member 3 a plurality of engagement means 4 are provided which are approximately parallel to the concave surface of the portion Fb, i.e. they form a diagonal grip pattern, wherein the longitudinal direction of each engagement means 4 forming an angle relative to the longitudinal direction of the driven shaft 6. See FIG. 3. The optimum being that the engagement means 4 form an angle of about 90° to the end of each pin bone, whereby the pin bones preferably are drawn out of the fillets at the same angle as they are attached to the fillet. These engagement means 4 are arranged to cooperate in manner known per se with the counter pressure element 5 for clamping the ends of the pin bones and thereby removing the same from the fillets F of fish.

In another embodiment, the rotatably driven member 3 is provided on a robotic arm, for instance, so that the same may be brought against the pin bones or the area where the pin bones are located in the fillets. In this embodiment, the fillets are preferably positioned on a flat conveyor belt or a conveyor belt provided with friction means.

The frame 1 and thereby the rotatably driven element 3 or only the rotatably driven element 3 is adapted to bear against, by an adjustable weight, for example, the area of the fillet F where the pin bones are located.

As an example it can be mentioned that in a fillet of cod, which has 17 pin bones, the pin bones form an angle to the "forehead" of the fish of about 35-45°. Furthermore, in a cross section of said fillet of cod, the pin bones form furthermore an angle of about 35-45° to the abdomen/stomach.

At different species of white fish said above-mentioned angles vary why it is important that the apparatus according to the invention may, in a simple way, be adapted accordingly, i.e. have possibility to exchange the rotatably driven member 3 to one with a different angle of the engagement means 4 relative to a vertical plane and possibly with a different radius of the curved engagement surface 4a.

As shown in FIGS. 1-3 and 5, the rotatable driven member 3 has the form of a sphere, wheel, ball or drum with curved envelope surface and with, in a preferred embodiment, two diametrically opposed flattened side surfaces 7. The rotatably driven member is preferably made of stainless steel or of any other suitable material. The drive shaft 6 is rotationally symmetrical placed at the centre of the side surfaces 7. More specifically, as mentioned above, the engagement surface 4a of the rotatably driven element 3, which cooperates with the counter pressure element 5, should have a shape complementary to the shape of the fillet of fish where the pine bones are located. The counter pressure element 5 may be made of a food grade plastic, Delrin®, for example, or any other suitable material.

Preferably, each engagement means 4 extends between the two diametrically opposed flattened side surfaces 7 of the rotatably driven member 3.

By way of example, for removal of pin bones from fillets of cod fishes, the rotatably driven element 3 has a diameter of 25-65 mm, preferably 35-55 mm, and particularly about 45 mm, and, in the embodiment with flattened side surfaces, a width of 20-40 mm, preferably 25-35 mm, and particularly about 30 mm. The counter pressure element 5 has a curved clamping surface 5a which is adapted to the engagement surface 4a, i.e. the radius of the rotatably driven element 3. In the case of a rotatable driven element 3 with a diameter of 45 mm, the clamping surface 5a of the counter pressure element 5 should have a radius of 22.5 mm, and the clamping surface 5a should abut against the engagement surface 4a for optimum clamping the ends of the pin bones between them.

In a preferred embodiment a support plate 10 is disposed before the rotatably drive member 3, as seen in the feeding direction of the fillets F. The support plate 10 serves a purpose to ensure that the fillets are not damaged and that the fillets are pushed towards the standing second conveyor belt 30, whereby the ends of the pin bines being exposed.

As shown in FIG. 4, each engagement means 4 has a particular profile which, as seen in cross section, includes a groove 40 having relatively to the curved engaging surface 4a two opposite perpendicular surfaces 41, and each surface 41 in its turn, preferably at right angle, transforms into a flat surface 42 connecting said opposite perpendicular surfaces 41 via an intermediate concavely curved surface 43.

The pin bones removed can be eliminated from the apparatus of the invention by means of water or vacuum.

The invention claimed is:

1. An apparatus for removal of pin bones from fish fillets, comprising
   a frame for supporting a drive device;
   a rotatably driven member driven by the drive device, the rotatably driven member being provided with engagement means for engaging a fish fillet, wherein the fish fillet has a first surface where a plurality of pin bones are located; and
   a counter pressure element for providing a clamping function between the counter pressure element and the rotatably driven element, wherein the rotatably driven member has a curved convex engagement surface directed towards the fillet and adapted to substantially correspond to the shape of the first surface of the fillet when the fillet is lying on a flat surface.

2. The apparatus according to claim 1, wherein the fish is from the family Gadidae.

3. The apparatus according to claim 2, wherein the fish is selected from the group consisting of cod, haddock, whiting and saithe.

4. The apparatus according to claim 1, wherein the rotatably driven member is mounted on a horizontal driven shaft for driving the driven member.

5. The apparatus according to claim 1, wherein the rotatably driven member has the shape of a sphere, a wheel, a ball or a drum with curved envelope surface.

6. The apparatus according to claim 5, wherein the rotatably driven member has two diametrically opposite flattened surfaces, wherein the driven shaft is rotationally symmetrical placed at the center of said surfaces, and wherein the rotatably driven member has a width of 25-35 mm between the flattened surfaces.

7. The apparatus according to claim 5, wherein the rotatably driven member has two diametrically opposite flattened surfaces, wherein the driven shaft is rotationally symmetrical placed at the center of said surfaces, and wherein the rotatably driven member has a width of 30 mm between the flattened surfaces.

8. The apparatus according to claim 1, wherein the rotatably driven member has a diameter of 25-65 mm.

9. The apparatus according to claim 5, wherein the rotatably driven member has two diametrically opposite flattened surfaces, wherein the driven shaft is rotationally symmetrical placed at the center of said surfaces, and wherein the rotatably driven member has a width of 20-40 mm, between the flattened surfaces.

10. The apparatus according to claim 1, wherein the frame and/or the rotatable driven member is adapted to bear against, by an adjustable weight, an area of the fillet where the pin bones are located.

11. The apparatus according to claim 1, wherein the counter pressure element has a surface which is directed towards the engagement surface of the rotatably driven member and the surface of the counter pressure element has a complementary shape to said engaging surface.

12. The apparatus according to claim 1, wherein the rotatably driven member is either disposed stationary or movable laterally relative to the fillet.

13. The apparatus according to claim 1, further comprising a first substantially horizontal conveyor belt having a low friction fillet receiving surface and a second conveyor belt having a high friction fillet back receiving surface, and wherein the second conveyor belt is angled about 90° relative to the first conveyor belt.

14. The apparatus according to claim 1, wherein each engagement means has a particular profile which, as seen in cross section, includes a groove having relatively to the curved engaging surface two opposite perpendicular surfaces, and each opposite perpendicular surface in its turn, at a right angle, transforms into a flat surface connecting said opposite perpendicular surfaces via an intermediate concavely curved surface.

15. The apparatus according to claim 1, wherein the rotatably driven member has a diameter of 35-55 mm.

16. The apparatus according to claim 1, wherein the rotatably driven member has a diameter of 45 mm.

* * * * *